United States Patent [19]

Aikman, Jr.

[11] Patent Number: 5,746,954
[45] Date of Patent: May 5, 1998

[54] PROCESSES FOR FORMING THIN, DURABLE COATINGS OF PERFLUOROCARBON IONOMERS ON VARIOUS SUBSTRATE MATERIALS

[75] Inventor: Robert E. Aikman, Jr., Lake Jackson, Tex.

[73] Assignee: The Dow Chemical Company, Midland, Mich.

[21] Appl. No.: 525,968

[22] Filed: Sep. 7, 1995

[51] Int. Cl.$^6$ .................... B28B 1/26; B29C 71/00
[52] U.S. Cl. .............. 264/87; 264/122; 264/127; 264/232; 264/340
[58] Field of Search ............ 264/87, 127, 122, 264/232, 340

[56] References Cited

U.S. PATENT DOCUMENTS

| | | | |
|---|---|---|---|
| 3,072,618 | 1/1963 | Turbak | 260/79.3 |
| 3,772,059 | 11/1973 | Shikada | 427/246 |
| 3,799,901 | 3/1974 | McCann et al. | 260/29.6 |
| 4,036,728 | 7/1977 | Babinsky | 204/283 |
| 4,038,213 | 7/1977 | McClure et al. | 252/430 |
| 4,112,149 | 9/1978 | Babinsky | 204/283 |
| 4,169,024 | 9/1979 | Fang | 204/98 |
| 4,181,592 | 1/1980 | Babinsky | 204/283 |
| 4,243,504 | 1/1981 | Fang et al. | 204/296 |
| 4,266,036 | 5/1981 | Baczek et al. | |
| 4,272,560 | 6/1981 | Baczek et al. | |
| 4,303,551 | 12/1981 | Vaughan | 252/430 |
| 4,330,654 | 5/1982 | Ezzell et al. | |
| 4,348,310 | 9/1982 | Silva et al. | 524/167 |
| 4,358,545 | 11/1982 | Ezzell et al. | |
| 4,433,082 | 2/1984 | Grot | 524/775 |
| 4,444,640 | 4/1984 | Tsai et al. | |
| 4,453,991 | 6/1984 | Grot | 156/94 |
| 4,454,176 | 6/1984 | Buckfelder | 427/246 |
| 4,470,859 | 9/1984 | Benezra et al. | |
| 4,568,441 | 2/1986 | Couitch et al. | |
| 4,606,805 | 8/1986 | Bon | |
| 4,661,411 | 4/1987 | Martin et al. | 428/421 |
| 4,666,573 | 5/1987 | DuBois et al. | 204/98 |
| 4,680,101 | 7/1987 | Darlington et al. | 204/295 |
| 4,720,334 | 1/1988 | DuBois et al. | 204/296 |
| 4,731,263 | 3/1988 | Martin et al. | 427/385.5 |
| 4,791,081 | 12/1988 | Childress et al. | 502/62 |
| 4,853,101 | 8/1989 | Hruska et al. | |
| 4,990,252 | 2/1991 | Tomaschke et al. | 427/246 A |
| 5,069,914 | 12/1991 | Gagliardi, Jr. | |
| 5,082,697 | 1/1992 | Patton et al. | 427/340 |
| 5,094,895 | 3/1992 | Branca et al. | |
| 5,136,474 | 8/1992 | Sarangapani et al. | 361/502 |
| 5,183,545 | 2/1993 | Branca et al. | |
| 5,206,279 | 4/1993 | Rowland et al. | 524/379 |

OTHER PUBLICATIONS

Thin and composite high–flux membranes of perfluorosulfonated ion–exchange polymer vol. 54, pp. 51–61; Journal of Membrane Science (1990).

Structure and related properties of solution–cast perfluorosulfonated ionomer films; Macromolecules 1987 vol. 20 pp. 1425–1428.

Dissolution of Perfluorinated ion–containing polymers; Anal Chem. 1982 1639–1641, vol. 54.

Morphology and chemical properties of the Dow perfluorosulfoate ionomers; Macromolecules 1989 pp. 3593–3599 vol. 22.

Chemical and morphological properties of solution–cast perfluorosulfonated ionomers; Macromolecules 1988, pp. 1334–1139, vol. 21, No. 5.

Silane coupling agents for attaching nafion to glass and silica; Anal.Chem. 1986, pp. 661–662 vol. 58.

Rod like micellar structures in perfluorinated solutions J. Phys. France 1988, 2101–2109, vol. 49.

Swelling study of perfluorosulphonated ionomer membranes, Polymer 1993 vol. 34 No. 2.

Small angle neutron scattering of perfluorosulfonated ionomers in solution; Macromolecules 1986; pp. 2651–2653, vol. 19, No. 10.

*Primary Examiner*—Karen Aftergut

[57] ABSTRACT

An improved process for forming a thin, durable coating of a perfluorosulfonated, salt- or acid-form ionomer on a selected substrate, which comprises contacting the substrate with an aqueous, surface active dispersion of the thermoplastic, sulfonyl fluoride precursor of the perfluorosulfonated, salt- or acid-form ionomer, contacting the dispersion-wetted substrate with a salt solution or a strongly ionizing acid solution of a sufficient ionic strength to cause a thin, adherent coating of the precursor particles in said dispersion to be formed on the substrate, then removing excess dispersion and excess salt or acid solution, annealing the coated substrate at an elevated temperature and thereafter converting the precursor to the desired acid or salt form ionomer.

11 Claims, No Drawings

PROCESSES FOR FORMING THIN, DURABLE COATINGS OF PERFLUOROCARBON IONOMERS ON VARIOUS SUBSTRATE MATERIALS

The present invention relates to processes for forming thin coatings of ion-containing polymers on selected substrates, and to the articles made thereby.

BACKGROUND

The known ion-containing polymers include the sulfonated polystyrenes, copolymers of ethylene with alpha-beta unsaturated carboxylic acids such as acrylic acid or methacrylic acid and the fluorocarbon ionomers. The substantially fluorinated, fluorocarbon ionomers include those having pendant chains which contain sulfur-based functional groups, phosphorus-based functional groups and carboxylic acid or carboxylate functionality. All of these materials, with the exception of the phosphorus-based fluorocarbon ionomers, are presently commercially-available.

The substantially fluorinated ionomers which have pendant chains containing sulfonic acid functional groups or a salt thereof have been of particular interest, and commercial examples of such ionomers have been produced in the acid form by E. I. DuPont de Nemours & Co., Inc., under the Nafion™ trademark, where n is 1, 2, 3 etc. and the ratio of a:b is typically about 7 to 1:

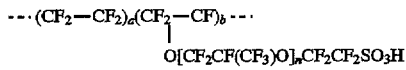

The Dow Chemical Company has produced perfluorinated ionomers having a shorter side-chain (acid-form) structure, wherein n is 0 in the preceding formula:

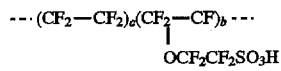

The production of these perfluorinated ionomers is described widely in the literature, for example, in U.S. Pat. No. 3,282,875, 4,329,435, 4,330,654, 4,358,545 and 4,940,525, and is well known to those familiar with the perfluorinated ionomer art. Fundamentally, however, as related in U.S. Pat. No. 4,038,213, for example (referencing U.S. Pat. No. 3,282,875 and 3,882,093), both types of these perfluorinated ionomers can be typically prepared by the emulsion copolymerization of tetrafluoroethylene and fluorovinyl ethers that contain sulfonyl groups, and the subsequent transformation of the resulting sulfonyl fluoride precursor to the acid or salt form ionomer as desired.

As related in commonly-assigned, copending U.S. Ser. No. 08/404,476 (currently pending as application Ser. No. 08/625,984) and U.S. Ser. No. 08/404,480 (currently pending as application Ser. No. 08/530,645), coatings have been applied from dispersions of these perfluorocarbon ionomers by evaporative coating techniques on various substrates, but the coatings produced by these processes have been less than satisfactory in one or more respects.

A significant focus of much of the literature to date has been the coating of polytetrafluoroethylene (PTFE) fibers and/or powders or particulate materials to make the PTFE fibers and/or particulate materials water-wettable. In this regard, PTFE possesses a number of desirable attributes, including excellent chemical stability. A significant barrier has existed however to the use of PTFE in certain applications, for example in the development of non-asbestos diaphragms for chlor-alkali cells, due to the hydrophobic nature of PTFE.

Various efforts have accordingly been made to compensate for or to overcome the hydrophobic character of PTFE in chlor-alkali diaphragms through the incorporation of ion-exchange materials by coating as well as by other means. An example of these efforts may be found in U.S. Patent No. 4,169,024 to Fang, wherein PTFE (or a similar fluoropolymer) in the form of a powder or fibers, in an unsupported porous or nonporous film, in a coating on an inert fabric or in a porous reinforced structure (that is, a diaphragm) is chemically modified by reaction with a sulfur- or phosphorus-containing compound.

U.S. Pat. No. 4,720,334 to DuBois et al. is also representative, and describes diaphragms containing from 65 to 99 percent by weight of a fibrillated fluorocarbon polymer such as PTFE and from 1 to 35 percent of fluorocarbon ionomer (preferably containing carboxylic acid, sulfonic acid, alkali metal carboxylate or alkali metal sulfonate functionality) based on the combined weight of fibrillated fluoropolymer and ionomer, and optionally further containing wettable inorganic particulate material. The diaphragm is dried and secured upon an underlying cathode by being heated to a temperature below the sintering temperature of PTFE for a time.

The ionomer can be incorporated in the diaphragm of the DuBois patent by codeposition from a slurry with the ionomer being included as a solid, gel or solution, by being coated on either or both of the fluorocarbon fibrils and inorganic particulate and then deposited from a slurry, or by being extruded in admixture with the fluoropolymer before it is fibrillated. Specific coating processes for coating the PTFE fibrils are described, including mixing PTFE powder with a solution of ionomer in a water-miscible solvent under high shear conditions, then dispersing the coated fibrils by blending with water and some surfactant.

Thereafter the materials are deposited onto the cathode from the resulting slurry.

Again, however, these efforts have not proven entirely successful. The aforementioned 08/404,476 and 08/404,480 applications (hereafter referred to as the '476 and '480 applications) accordingly offer alternative, improved processes for imparting improved wettability to PTFE to be incorporated into a chlor-alkali diaphragm, and especially a non-asbestos chlor-alkali diaphragm, via one or more thin, durable coatings of the relatively more costly perfluorocarbon ionomer applied thereto.

In the '476 application, for example, a colloidal, surface active dispersion of a perfluorosulfonate ionomer is used to contact a PTFE substrate, after which the coated PTFE substrate, while still wetted with the dispersion and without an intervening drying step, is exposed to a salt solution or to a solution of a strongly ionizing acid. Annealing of the coated PTFE, as in the bonding at from about 330 degrees Celsius to about 355 degrees Celsius of a diaphragm incorporating coated PTFE materials therein, results in a more durable, strongly adhering coating of the ionomer on the PTFE, but can result also in a reduced improvement in wettability as compared to an uncoated PTFE substrate.

The '480 application in turn is particularly directed to a solventless, batch coating process for coating PTFE, for example, with an ionomer coating, whereby the flammability and safety hazards associated with the use of a lower alcohol in making these sorts of dispersions can be avoided as well as the necessity of a step for evaporating the organic solvent, and in which PTFE is combined with a colloidal surface active dispersion of a perfluorocarbon ionomer in water and with a salt or strongly ionizing acid and the mixture is subjected to high shear conditions. Again, annealing conditions associated with the bonding of a non-asbestos diaphragm incorporating the coated PTFE provides improved durability and adhesion of the coating to the PTFE substrate, with however some reduction in wettability being seen generally in comparison to an unannealed, coated PTFE.

SUMMARY OF THE PRESENT INVENTION

By the present invention, it has been discovered that by (a) coating a PTFE or other substrate with an aqueous dispersion of the thermoplastic, sulfonyl fluoride precursor of the perfluorosulfonic acid form and perfluorosulfonate salt form ionomers (which corresponds to the latex produced in the emulsion polymerization of tetrafluoroethylene and a fluorovinyl ether containing sulfonyl groups or which is derived therefrom by the addition or removal of water, and/or by the addition of surfactant or through the use of a lower alcohol or other added solvent for making aqueous, surface active dispersions of these materials which will wet out the substrate to be coated), (b) contacting the dispersion-wetted substrate with a salt solution or a strongly ionizing acid solution of a sufficient ionic strength to cause a thin, adherent coating (which may be continuous but is not necessarily so) of the precursor particles in the dispersion to be formed on the substrate, (c) removing excess latex and excess salt or acid solution, (d) annealing the coated substrate at an elevated temperature, and only thereafter (e) converting the precursor to the desired acid or salt form ionomer, the improvement in wettability observed in the '476 and '480 applications prior to annealing and more particularly prior to a bonding cycle in a chlor-alkali diaphragm incorporating the same, can be substantially realized after the bonding, for example, of a non-asbestos chlor-alkali diaphragm including coated poly(tetrafluoroethylene) (PTFE) particulate material or fibers at from about 330 degrees Celsius up to about 355 degrees Celsius, and the subsequent conversion of the precursor particles in the bonded diaphragm to the desired, water-wettable ionomer.

A corresponding process is thus provided in a second aspect of the present invention, for manufacturing a diaphragm for use in a chlor-alkali diaphragm cell. This process comprises (a) coating a substrate which is to be incorporated into the diaphragm and with respect to which an improvement in hydrophilicity is desired (for example, PTFE fibers or particulate material (which can be in powdered or granular form), or a fiber composite of the type described in U.S. Pat. No. 4,853,101 to Hruska et al. which includes PTFE fibers or fibrils) with the thermoplastic, sulfonyl fluoride precursor of the perfluorosulfonic acid form and perfluorosulfonate salt form ionomers via an aqueous surface active dispersion containing the precursor, (b) forming an aqueous draw slurry including the coated substrate, (c) drawing a diaphragm from the draw slurry through vacuum deposition on a diaphragm support, (d) drying and then bonding the diaphragm under bonding conditions, and thereafter (e) hydrolyzing the sulfonyl fluoride precursor within the bonded diaphragm to its perfluorosulfonate, sodium salt form ionomer through contact with sodium hydroxide.

One contemplated application of the present invention would, in the context of the just-summarized process for manufacturing a diaphragm for use in a chlor-alkali diaphragm cell, employ the thermoplastic, sulfonyl fluoride precursor and/or less expensive and insufficiently chemically resistant materials which are coated with the precursor, in direct replacement of some or all of the PTFE or other chemically-resistant fluoropolymer materials conventionally used in non-asbestos diaphragm formulations. The precursor could, for example, be used in replacement of PTFE particulate materials which have been employed as a binder, with a reduction in the bonding temperatures required to bond diaphragms made therefrom (i.e., from about 330 degrees Celsius or greater for PTFE to in the neighborhood of 300 degrees Celsius or greater for the thermoplastic, sulfonyl fluoride precursor) and a corresponding reduction in the energy requirements to carry out the bonding step.

The desirability of employing the thermoplastic, sulfonyl fluoride polymer as a binder and bonding at lower temperatures, whether by causing the coating on PTFE fibers and/or particulate materials in a diaphragm consisting of wettable inorganic particulate materials, PTFE fibers and particulate materials to soften and flow sufficiently to knit the various constituent materials together into a whole, or by causing the coating on a less expensive (than PTFE) but insufficiently chemically resistant substrate to soften and flow in a diaphragm comprised of wettable inorganic particulate materials, the coated substrate and perhaps but not necessarily including PTFE fibers and/or particulates also, will be dependent on the amount of the sulfonyl fluoride precursor which must be employed to effectively bind the materials of the diaphragm together while still protecting the underlying substrate from degradation, the comparative cost of this precursor and the underlying substrate versus the cost of the PTFE to be replaced, and any energy savings to be realized by being able to bond at a lower temperature than for the PTFE.

DETAILED DESCRIPTION OF PREFERRED EMBODIMENTS

The process of the present invention will preferably employ colloidal, surface active aqueous dispersions of the thermoplastic, sulfonyl fluoride precursor of an ionomer with an equivalent weight in the range of from about 500 to about 1500, and more preferably with an equivalent weight of from about 550 to about 1200. Most preferably, a thermoplastic, sulfonyl fluoride precursor will be employed of The Dow Chemical Company's shorter side chain ionomers having an equivalent weight of from about 550 to about 1000, and especially from about 550 to about 800.

Dispersions are commercially available or have been made previously of perfluorosulfonic acid or perfluorosulfonate ionomers of various equivalent weights in organic solvent-containing systems, for example, in a mixture of water and a lower alcohol such as ethanol or propanol as taught in U.S. Pat. No. 4,433,082 to Grot. These types of dispersions have been recognized as disadvantageous in the ionomer coating art owing to their flammability and other concerns, and the commonly-assigned '480 application referenced above is accordingly particularly directed to a solventless coating process for coating PTFE, for example, wherein the disadvantages and hazards associated with the use of the prior art's organic solvents can be avoided as well as the necessity of a step for evaporating the organic solvent.

The process of the present invention is preferably though not necessarily also a "solventless" coating process, in employing an aqueous dispersion of the sulfonyl fluoride precursor of the contemplated ionomers rather than of the ionomers themselves, which may consist of the latex resulting from the emulsion polymerization of tetrafluoroethylene and a sulfonyl group-containing fluorovinyl ether to form such precursor or which may be prepared at a variety of weight percents of the thermoplastic precursor simply by the addition or removal of water from the latex. The resulting aqueous dispersion may be coated onto a selected substrate in a first embodiment by immersing or otherwise contacting the substrate with the dispersion for an extended length of time or with agitation over a lesser period of time.

Most preferably, however, a surfactant will be added to the latex from the emulsion polymerization, to increase the speed and ease of wetting out the selected substrate with the dispersion of the thermoplastic sulfonyl fluoride precursor. This surfactant may be the same or different than that which is employed during the initial, emulsion polymerization giving rise to the precursor, but is most preferably a fluorosurfactant containing a sulfonate group (such as a sodium sulfonate group, as in the exemplified FC-95™ potassium perfluoroalkyl sulfonate-based surfactant from Minnesota Mining and Manufacturing Co., Inc.) which will not be degraded during the bonding cycle of a chlor-alkali diaphragm in an especially preferred application for the coated materials of the present invention.

The dispersion-wetted substrate is then contacted with a salt solution or a strongly ionizing acid solution of a sufficient ionic strength to cause a thin, adherent coating (which may be continuous but is not necessarily so) of the thermoplastic sulfonyl fluoride precursor particles in the dispersion to be formed on the substrate. This may involve stirring the coated substrate into the salt or acid solution (where the coated substrate is a particulate material or fiber) or immersing the coated substrate in the acid or salt solution (where the substrate is a coupon or the like), or will simply and preferably involve adding the salt or acid to the mixture including the substrate and the dispersion. It should be understood that the "salt solution" or "acid solution" specified in the Summary of the Invention above may in this manner be formed using the water of the dispersion, and that "contacting the dispersion-wetted substrate . . . " accordingly does not necessarily require that a separate solution be formed of the salt or acid, and indeed a separate acid or salt solution will preferably not be formed.

The acids which can be added to the dispersion/substrate mixture include those acids which are conventionally known or classified in the art as "strong" acids, for example, nitric acid, hydrochloric acid or sulfuric acid.

Preferably, however, a salt solution will be employed for contacting the dispersion-wetted substrate. Typically in excess of about 1 percent by weight of the salt will be employed in the dispersion/substrate mixture, and preferably the salt will comprise from about 5 percent by weight of the mixture to saturation. Salts which have been found generally suitable for use in the present invention include cations such as hydrogen, alkali metals, alkaline earth metals and transition metals, ammonium and alkylammonium cations in water-soluble combinations with any anion such as sulfate, fluoride, chloride, bromide, iodide, carbonate, phosphate, acetate, hydroxide, nitrate or thiocyanate.

The sodium and magnesium salts have been found especially useful in forming essentially continuous coatings on substrates such as PTFE, with sodium chloride, sodium carbonate, sodium acetate and sodium bisulfate being still more preferred, and sodium chloride and sodium carbonate being especially preferred in the context of forming a draw slurry with PTFE particulates and/or fibers which have been wetted with an aqueous dispersion of thermoplastic sulfonyl fluoride precursor particles.

An evenly thin coating is at this point formed of the sulfonyl fluoride precursor particles on the substrate, which coating is sufficiently durable to be rinsed in water without being substantially removed, but which can be removed with mechanical abrasion.

The adhesion of the coating is improved, as in the earlier-referenced commonly-assigned applications, upon removing excess latex and salt or acid solution to recover the coated substrate, and annealing the coated substrate at an elevated temperature below the decomposition temperature of the ionomer coating. Where the coated substrate is a coupon or some other article, for example, a foraminous support on which has been formed a diaphragm including coated PTFE fibers and/or particulates, the coupon or other article may be removed from the mixture with the dispersion or latex and the salt or acid. Where the substrate is in particulate or fibrous form, the coated substrate can be isolated by filtration or the like.

Preferably, the annealing will occur near the glass transition temperature ($T_g$) of an amorphous polymeric substrate or near the crystalline melting point of a crystalline polymeric substrate, and the thermoplastic precursor and substrate will be selected such that the thermoplastic precursor will flow freely under the conditions of annealing, whereby the precursor is able to coat over anomalies and changes in the surface of the polymeric substrate occasioned by the annealing. It is considered to be largely due to this feature that the same improvement in wettability seen prior to annealing in the previously-referenced, commonly-assigned applications but not maintained through the annealing, for example, of coated PTFE at the sintering or bonding temperatures which are necessary for achieving adequate diaphragm strength and integrity in a chlor-alkali diaphragm including PTFE in fibrous or particulate form as a binder, is nevertheless realized after the annealing at such bonding temperatures of PTFE which has been coated with particles of the thermoplastic sulfonyl fluoride precursor of a desired perfluorosulfonate, sodium form ionomer, and the subsequent conversion of the precursor to the perfluorosulfonate, sodium form ionomer via a sodium carbonate draw carrier and exposure to sodium hydroxide.

The substrates which may be coated by the process of the present invention are numerous, and may desirably include, for example, fibers and particulates of polymeric substrates such as polytetrafluoroethylene, polyvinylidene fluoride, fluorinated ethylene-propylene copolymers (FEP), poly (vinyl chloride), polypropylene, chlorotrifluoroethylene or perfluoroalkoxyvinyl ether-tetrafluoroethylene copolymers (such as are sold under the designation Teflon PFA™ by E.I. DuPont de Nemours & Co., Inc.).

A particularly preferred application however is for coating polytetrafluoroethylene (PTFE) fibers and/or particulates to make the PTFE fibers and/or particulates water-wettable, particularly when bonded in a chlor-alkali diaphragm and especially a non-asbestos chlor-alkali diaphragm incorporating significant amounts of PTFE in fibrous or particulate form or in a fiber composite of the type described in U.S. Pat. No. 4,853,101 to Hruska et al.

A corresponding process is thus provided in a second aspect of the present invention, for manufacturing a diaphragm for use in a chlor-alkali diaphragm cell. This process in a preferred embodiment comprises coating PTFE fibers and/or particulates or the just-mentioned fiber composite to be incorporated into the diaphragm and with respect to which an improvement in hydrophilicity is desired with the thermoplastic, sulfonyl fluoride precursor of the perfluorosulfonic acid form and perfluorosulfonate salt form ionomers via an aqueous surface active dispersion containing the precursor, forming an aqueous draw slurry including the coated substrate with sodium carbonate or sodium chloride, drawing a diaphragm from the draw slurry through vacuum deposition on a diaphragm support, drying and then bonding the diaphragm under bonding conditions, and thereafter hydrolyzing the sulfonyl fluoride precursor within the bonded diaphragm to its perfluorosulfonate, sodium salt form ionomer through contact with sodium hydroxide.

Preferably the draw slurry is formed on a batchwise basis, through the addition to a draw vat of water, a surfactant, sodium carbonate (more preferred) or sodium chloride (less preferred), PTFE fibers and/or particulates and/or a composite fiber as taught in U.S. Pat. No. 4,853,101 to Hruska et al., the latex including the thermoplastic sulfonyl fluoride precursor of the desired ionomer, and optionally and preferably including the addition of various other conventional hydrophilic diaphragm additives or components, for example, titanates, oxides or silicates, with the order of addition of these draw slurry components not being critical and with some of the components being optionally premixed if desired (for example, the water and the precursor-containing latex). The coating step recited in the preceding paragraph can consequently be accomplished in the process of forming the draw slurry incorporating the coated substrate resulting from the coating step, and is in fact preferably accomplished in this manner so that the recitation of forming the draw slurry including the coated substrate should not in the preceding paragraph be taken as necessarily requiring that the substrate be coated in a prior, separate step before being included in the draw slurry.

It is thus contemplated that the present invention will be useful generally with the array of known polymer-modified asbestos diaphragms and non-asbestos diaphragms, wherein a normally hydrophobic material such as PTFE is incorporated in some form, whether as a fiber, a particulate material, a combination of fibers and particulates, or in a composite fiber of the sort described in the Hruska patent, to impart improved chemical resistance to the diaphragm in question. A particularly preferred use will be in making non-asbestos diaphragms in accordance with the teachings of commonly-assigned U.S. patent application Ser. No. 08/525,969, entitled "Novel Non-Asbestos Diaphragm Separator" and filed concurrently herewith, such application being incorporated herein by reference.

As more completely described therein, a diaphragm is preferably prepared which is comprised of zirconium oxide as a principal, hydrophilic component, PTFE fibers and PTFE particulate material as a binding material, and which is characterized by a median pore diameter between about 0.1 micrometers and about 0.7 micrometers and a product of the Macmullin number (Nmac) and diaphragm thickness (t, in millimeters) which is between about 5 and about 25 millimeters, where these parameters are measured as taught in the referenced application. Most preferably, the diaphragm will have a median pore diameter between about 0.1 and about 0.3 micrometers and an Nmac×t value greater than about 11 millimeters.

Preferably the draw slurry employed in constructing these diaphragms will have a slurry solids concentration between about 190 and about 250 grams per liter, and more preferably of about 250 grams per liter to about 280 grams per liter and higher, with the higher concentrations generally having been found to result in higher caustic current efficiencies. The slurry will generally contain from about 60 weight percent to about 81 weight percent of zirconium oxide (typically having a particle size between about 0.85 microns and about 1.7 microns), from about 14 to about 31 percent of a PTFE particulate (for example, Teflon™ 7C granular PTFE from E. I. DuPont de Nemours & Company, Inc., having an average particle size of about 30 microns), and from about 5 to about 9 weight percent of PTFE fibers (for example, as shown in the referenced, commonly-assigned application, bleached 0.25 inch long, 3.2 denier PTFE fibers). More preferably and typically, from about 75 to 76 weight percent will be zirconium oxide, with from 14 to 16 percent of the particulate PTFE and from 6 to 8 weight percent of PTFE fibers.

Sodium carbonate will preferably be used for the draw carrier, at a concentration in water which will typically be from about 3 percent by weight to about 20 percent by weight. A suspending agent will preferably be used, with the suspending agent preferably being aluminum chloride or xanthan gum, most preferably being xanthan gum. The concentration of the suspending agent will be sufficient to keep the zirconium oxide in suspension, for example, between about 1.0 and about 1.8 grams per liter. An aqueous latex prepared from a thermoplastic, sulfonyl fluoride precursor (prepared via an emulsion polymerization process) of a perfluorosulfonate ionomer having an equivalent weight of preferably less than about 800, and preferably of about 650 or less, will be added with a sufficient amount of surfactant (typically the same surfactant as used in the emulsion polymerization giving rise to the sulfonyl fluoride precursor) to wet out the PTFE initially.

The diaphragm is vacuum drawn from the draw slurry on a foraminous cathode which has optionally been stress-relieved beforehand, for example, by heating a conventional carbon steel cathode to about 500 degrees Celsius for an hour. Preferably the drawing is accomplished at temperatures, for example, in the neighborhood of 70 to 100 degrees Fahrenheit, and with flow control of residual slurry through the vacuum flow line of the draw vat to prevent pinholing of the diaphragm.

The diaphragm is thereafter dried by continuing application of a vacuum thereon and by oven drying, or simply by oven drying. A slow, uniform drying is desired in any event to avoid blistering of the diaphragm at the preferred drying temperatures of from about 40 degrees Celsius to about 110 degrees Celsius, and where oven drying is employed preferably the diaphragm is placed in a position in the drying oven wherein the air flow surrounding the diaphragm is relatively free and uniform.

Upon completion of the drying cycle, the diaphragm is bonded in a bonding oven at temperatures between about 330 degrees Celsius and about 355 degrees Celsius, with preferred temperatures being from 335 degrees Celsius up to about 350 degrees, provided the oven can be controlled at these temperatures without exceeding 355 degrees Celsius at any area of the diaphragm. The sintering of the diaphragm is preferably accomplished by slowly ramping up to the desired temperature (e.g., at about 2 degrees Celsius per minute), maintaining this temperature for a period of time, for example, about one half hour, and then slowly cooling the diaphragm at a rate for example of about 2 degrees Celsius per minute.

The precursor coated onto the PTFE materials in the diaphragm then in the presence of sodium hydroxide is converted to the perfluorosulfonate, sodium salt form ionomer, as recited above.

9

The present invention is more particularly illustrated by the Examples which follow.

ILLUSTRATIVE EXAMPLES

Example 1

Tetrafluoroethylene ($CF_2=CF_2$) was copolymerized with $CF_2=CFOCF_2SO_2F$ in an emulsion polymerization system, according to the teachings of U.S. Pat Nos. 4,330,654 and 4,358,545, to provide a 640 equivalent weight ionomer precursor at 27 percent by weight in water.

A polytetrafluoroethylene (PTFE) coupon was placed directly in the 27 weight percent latex from the emulsion polymerization step, and allowed to soak in the latex until wetted with the latex for sixteen hours. The coupon was removed from the latex and allowed to air dry at ambient temperatures, whereupon the dried coupon was heated to 300 degrees Celsius at a rate of 30 degrees per minute and held at 300 degrees Celsius for one hour. The coupon was cooled to ambient temperature and placed in a 15 weight percent solution of sodium hydroxide in water, which was then heated to 80 degrees Celsius and held there for 1.5 hours. The coupon was removed from the NaOH, rinsed with deionized water, air dried and the contact angle measured with water.

The method used for making this contact angle measurement, and those made in subsequent examples below, involved equilibration of the coupon in question in water at ambient temperatures, generally over a period of 16 hours or so.

The coupon was thereafter removed from its deionized water soak and patted dry, then placed on the stage of a Kernco Contact Angle Meter, Model G-1 contact angle measuring device; several measurements (10 to 14 measurements) were taken of the contact angle with water of the coated coupon on this device. Where the coupon in question would not lie flat on the device, ¼ inch diameter disks were cut therefrom using a hole punch and the contact angles determined on the sides of the disks which had not been exposed to the punch. Two measurements were made using the opposite edges of each disk, and the measurements averaged as with the coupons.

The average contact angle for this particular coupon was determined to be 64 degrees, and the coating was not removed with adhesive tape.

Example 2

One gram of Teflon™ 7C granular PTFE was stirred in the same latex as used in Example 1 until wetted with the latex, over about sixteen hours. The coated PTFE was then filtered, and the wet filter cake was heated to 300 degrees Celsius at 30 degrees Celsius per minute. After being held at 300 degrees Celsius for an hour, the material was cooled to ambient temperature and placed in 15 weight percent sodium hydroxide solution with water. The mixture was heated to 80 degrees Celsius and held at such temperature for 2 hours, then the solids were isolated by filtration. The solids were then rinsed with deionized water and placed in a Safranine O™, 3,7-diamino-2,8 dimethyl-5-phenyl-phenazinium chloride, cationic dye solution (Aldrich Chemical Co., Inc, Milwaukee, Wis.) to check for coating of the PTFE powder. The dyed ionomer coating was evident completely surrounding and encapsulating the PTFE particles, and there were no indications of voids, gaps or debonding of the ionomer coating from the PTFE particles.

Example 3

A dispersion was formed in water of 27 percent by weight of the ionomer precursor, and 2.5 grams of this dispersion were combined with 47.5 grams of a 0.2 weight percent solution of FC-95™ surfactant (a potassium perfluoroalkyl sulfonate-based surfactant, Minnesota Mining and Manufacturing Company, Inc.). A PTFE coupon was placed in the resulting dispersion, and 5 grams of NaCl were added. The coupon was removed and allowed to air-dry at ambient temperature, then was heated to 350 degrees Celsius and held there for 70 minutes. The coupon was allowed to cool to ambient temperature, then was exposed to a 10 weight percent solution of NaOH in water at 80 degrees Celsius for one hour. The coupon was rinsed with deionized water and allowed to air-dry. The average contact angle of the coated coupon with water over 21 measurements was found to be 90 degrees, with a standard deviation of 3.7 degrees. An uncoated PTFE coupon was for comparison heated to 350 degrees Celsius for 70 minutes, then allowed to cool. The average contact angle for the uncoated coupon over 21 measurements was 142.3 degrees, with a standard deviation of 8.71 degrees.

Example 4

Twenty-five grams of the 27 weight percent ionomer precursor latex formed in Example 1 were mixed with 25 grams of a mixture including equal parts by volume of ethanol and water. A PTFE coupon was placed in the mixture, withdrawn and placed in 10 weight percent solution of NaCl in water. The coupon was then withdrawn and allowed to air-dry, then was heated to 350 degrees Celsius and held at such temperature for an hour. The bonded coupon was cooled to ambient temperature, and the contact angle found on average to be 69.7 degrees, with a standard deviation of 9.1 degrees.

Example 5

Ten grams of the same ionomer precursor dispersion employed in Example 4 were mixed with 40 grams of an equal parts by volume mixture of ethanol and water, and a PTFE coupon immersed therein. The coupon was withdrawn, and placed in a 10 weight percent NaCl solution in water. The coupon was then withdrawn and allowed to air-dry, whereupon the air-dried coupon was heated to 350 degrees Celsius and maintained at this temperature for an hour. After cooling to ambient temperature, the contact angle on average over 10 measurements was determined to be 88.3 degrees Celsius, with a standard deviation of 5.8 degrees.

Example 6

Forty-nine and one half grams (49.5 grams) of the 0.2 weight percent surfactant solution employed in Example 3 was mixed with 0.5 grams of the 27 weight percent ionomer precursor dispersion or latex from Example 1, and a PTFE coupon placed in the combination. Five grams of NaCl were added to the mixture, the coupon was withdrawn and allowed to air-dry at ambient temperature. The dried coupon was then annealed at 350 degrees Celsius for an hour, cooled to room temperature, placed in a 10 weight percent solution of NaOH in water and hydrolyzed at 80 degrees Celsius for an hour. After hydrolysis the coupon was rinsed with deionized water and allowed to air-dry. The contact angle on averaging 15 measurements was determined to be 95.5 degrees, with a standard deviation of 8.2 degrees.

Example 7

An aqueous latex formed from the emulsion polymerization in Example 1, and containing 27 percent by weight of the 640 EW (equivalent weight) ionomer precursor, was diluted by combining 0.11 grams of the 27 weight percent latex with 25 grams of deionized water. One gram of Polyramix PMX™ composite fibers from Oxytech Systems Inc. was added and the mixture stirred for fifteen minutes, whereupon 2.5 grams of $Na_2CO_3$ were stirred into the slurry and stirring continued for thirty minutes. Stirring was stopped, and the solids allowed to settle. Excess liquid was decanted from the settled fibers, and the coated fibers were dispersed in 20 grams of finely ground sodium chloride and the mixture heated to 335 degrees Celsius for one hour. The fibers were then cooled to ambient temperature, and placed in 100 grams of a 10 weight percent solution in water of sodium hydroxide. The sodium hydroxide/fiber slurry mixture was heated to boiling and then allowed to cool to ambient temperature, and after allowing the fibers to settle excess liquid was decanted and the fibers washed with deionized water. The coated annealed fibers were observed to be wettable in water and in the sodium hydroxide solution.

Example 8

The same materials and procedures were employed for this example as in Example 7, except that the amount initially used of the 27 weight percent precursor latex was cut in half, from 0.11 grams to 0.055 grams. The coated annealed fibers were again observed to be wettable in water and in the sodium hydroxide solution.

Comparative Example

For comparison, one gram of the PMX™ composite fibers were stirred in deionized water for 15 minutes, and 2.5 grams of sodium carbonate were then stirred into the slurry. After thirty minutes of stirring, the fibers were allowed to settle and the excess liquid decanted. The uncoated fibers were dispersed in 20 grams of finely ground sodium chloride and the mixture heated to 335 degrees Celsius for an hour. The heated fibers were cooled to ambient temperature and then were placed in 100 grams of 10 percent by weight of sodium hydroxide in water. The sodium hydroxide/fiber slurry was heated to boiling and then allowed to cool to ambient temperature. The uncoated fibers did not wet out and settle in either the sodium hydroxide solution or water.

What is claimed is:

1. A process for manufacturing a diaphragm for use in a chlor-alkali diaphragm cell, comprising:

coating a tetrafluoroethylene-containing particulate or fibrous substrate which is to be incorporated into the diaphragm and with respect to which an improvement in hydrophilicity is desired with a thermoplastic, sulfonyl fluoride precursor of a perfluorosulfonated, salt- or acid-form ionomer via an aqueous, surface active dispersion containing the precursor;

forming an aqueous draw slurry including the coated substrate;

drawing a diaphragm from the draw slurry through vacuum deposition on a foraminous diaphragm support;

drying and then bonding the diaphragm under bonding conditions; and thereafter hydrolyzing the sulfonyl fluoride precursor within the bonded diaphragm to its perfluorosulfonate, sodium salt- or acid-form ionomer.

2. A process as defined in claim 1, wherein the bonding of the PTFE substrate is conducted at temperatures of about 330 degrees Celsius to about 355 degrees Celsius.

3. A process as defined in claim 2, wherein the bonding of the PTFE substrate is conducted at temperatures of about 335 degrees Celsius to about 350 degrees Celsius.

4. A process as defined in claim 1, wherein the ionomer which is finally coated onto the substrate is of the following formula when in an acid form:

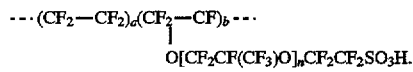

5. A process as defined in claim 1, wherein the ionomer which is finally coated onto the substrate is of the following formula when in an acid form:

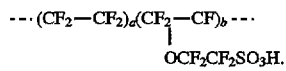

6. A process as defined in claim 4, wherein the ionomer has an equivalent weight in a range of from about 500 to about 1500.

7. A process as defined in claim 6, wherein the ionomer has an equivalent weight of from about 550 to about 1200.

8. A process as defined in claim 5, wherein the ionomer has an equivalent weight in the range of from about 550 to about 1000.

9. A process as defined in claim 8, wherein the ionomer has an equivalent weight of from about 550 to about 800.

10. A process as defined in claim 9, wherein the ionomer has an equivalent weight from about 550 to about 650.

11. A process as defined in claim 1, wherein the substrate is a composite fiber comprised of one or more non-organic particulate materials bound to an organic polymer in fiber form.

* * * * *